United States Patent
Takakura et al.

(10) Patent No.: US 11,468,252 B2
(45) Date of Patent: Oct. 11, 2022

(54) INFORMATION PROCESSING APPARATUS AND INFORMATION PROCESSING METHOD

(71) Applicant: PANASONIC INTELLECTUAL PROPERTY MANAGEMENT CO., LTD., Osaka (JP)

(72) Inventors: Tomohito Takakura, Kanagawa (JP); Kohei Takada, Kanagawa (JP); Kenichiro Shimano, Kanagawa (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/150,582

(22) Filed: Jan. 15, 2021

(65) Prior Publication Data

US 2021/0271834 A1    Sep. 2, 2021

(30) Foreign Application Priority Data

Feb. 27, 2020   (JP) .............................. JP2020-032122

(51) Int. Cl.
| | |
|---|---|
| *G06K 7/10* | (2006.01) |
| *G06Q 20/20* | (2012.01) |
| *G07F 7/08* | (2006.01) |
| *G06K 7/08* | (2006.01) |
| *G06K 7/00* | (2006.01) |

(52) U.S. Cl.
CPC ....... *G06K 7/10415* (2013.01); *G06K 7/0065* (2013.01); *G06K 7/087* (2013.01); *G06Q 20/204* (2013.01); *G07F 7/0873* (2013.01)

(58) Field of Classification Search
CPC .. G06K 7/10415; G06K 7/087; G06K 7/0065; G06K 7/0004; G06K 17/0025; G06Q 20/204; G07F 7/0873; G07F 7/0893
See application file for complete search history.

(56) References Cited

U.S. PATENT DOCUMENTS

| | | | |
|---|---|---|---|
| 10,120,427 B1* | 11/2018 | Hebner | ..................... G06F 1/26 |
| 10,366,383 B2* | 7/2019 | Glashan | .............. G06Q 20/327 |
| 2004/0130568 A1 | 7/2004 | Nagano et al. | |
| 2010/0095241 A1 | 4/2010 | Nagano et al. | |
| 2014/0115528 A1 | 4/2014 | Nagano et al. | |

(Continued)

FOREIGN PATENT DOCUMENTS

JP    2004-054134    2/2004

*Primary Examiner* — Sonji N Johnson
(74) *Attorney, Agent, or Firm* — Greenblum & Bernstein, P.L.C.

(57) ABSTRACT

An information processing apparatus includes a first reader electrically reading a first information in a non-contact manner; a second reader electrically or magnetically reading a second information; a touch panel electrically detecting the contact or proximity of an object; and a CPU electrically connected to the first reader, the second reader, and the touch panel. The CPU exclusively controls an ON/OFF of the first reading function of the first reader and an ON/OFF of the input detection function of the touch panel, based on a detection that the communication medium is placed in a predetermined position with respect to the first reader or a detection that the card is placed in a predetermined position with respect to the second reader.

11 Claims, 10 Drawing Sheets

(56) References Cited

U.S. PATENT DOCUMENTS

| | | | |
|---|---|---|---|
| 2014/0316916 A1* | 10/2014 | Hay | G06Q 20/20 |
| | | | 705/17 |
| 2015/0242663 A1* | 8/2015 | Babu | G06F 1/3215 |
| | | | 235/380 |
| 2016/0308371 A1* | 10/2016 | Locke | H02J 50/001 |

\* cited by examiner

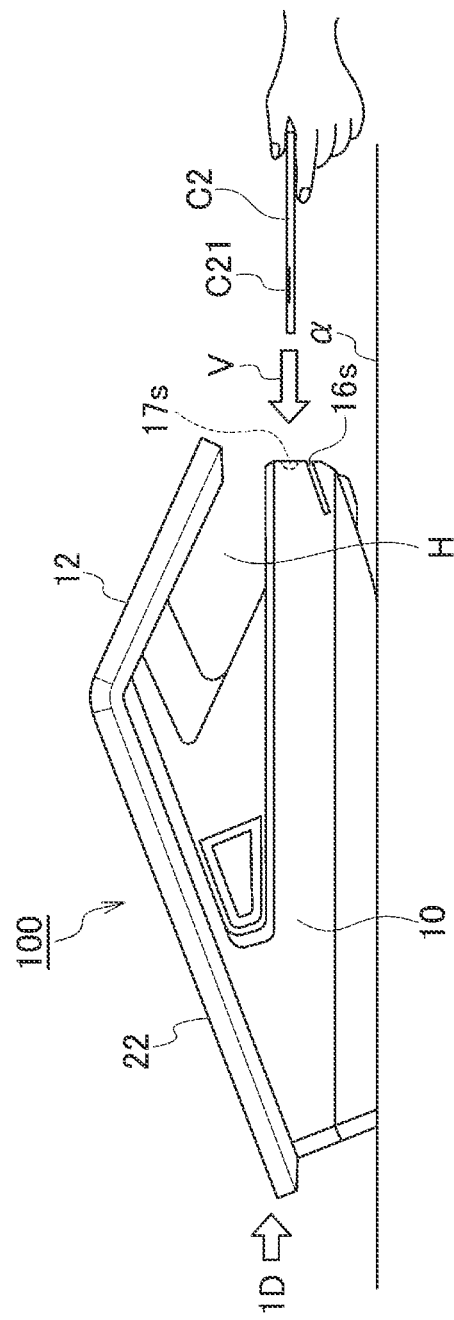

INFORMATION PROCESSING APPARATUS AND INFORMATION PROCESSING METHOD

CROSS-REFERENCE TO RELATED APPLICATIONS

This application is based on and claims priority under 35 USC 119 from Japanese Patent Application No. 2020-032122 filed on Feb. 27, 2020, the contents of which are incorporated herein by reference.

TECHNICAL FIELD

The present invention relates to an information processing apparatus and an information processing method.

BACKGROUND ART

A non-contact card reader for a security system is known in the related art. The non-contact card reader for a security system includes a housing, a wireless communication device that is provided inside the housing and includes an antenna for wirelessly communicating with a non-contact IC card, a numeric keyboard that is provided outside the housing and is used to input a signal in contact, and a control device that is provided inside the housing and is electrically connected to the wireless communication device and the numeric keyboard. When a signal is input to the numeric keyboard, the control device stops wireless communication between the non-contact IC card and the wireless communication device, and when the non-contact IC card and the wireless communication device are wirelessly communicated with each other, the control device stops an input operation of the signal to the numeric keyboard.

CITATION LIST

Patent Literature

Patent Literature 1: JP-A-2004-54134

SUMMARY OF INVENTION

In the technique disclosed in Patent Literature 1, when the card reader reads the non-contact IC card and a card other than the non-contact IC card, reading accuracy of the non-contact IC card and electrical detection accuracy of an input operation may be reduced.

The present invention provides an information processing apparatus and an information processing method that can prevent reading accuracy of a non-contact IC card and input operation detection accuracy of an electrical signal input operation from being deteriorated even when reading an information stored in the non-contact IC card and an information stored in a card other than the non-contact IC card.

According to an aspect of the present invention, an information processing apparatus includes a first reader that has a first reading function which electrically reads a first information stored in a communication medium in a non-contact manner; a second reader that has a second reading function which electrically or magnetically reads a second information stored in a card in contact; a touch panel that electrically detects the contact or proximity of an object as an input detection function; and a CPU that is electrically connected to the first reader, the second reader, and the touch panel. The CPU exclusively controls an ON/OFF of the first reading function of the first reader and an ON/OFF of the input detection function of the touch panel, based on a detection that the communication medium is placed in a predetermined position with respect to the first reader or a detection that the card is placed in a predetermined position with respect to the second reader.

According to an aspect of the present invention, an information processing method of an information processing apparatus is provided. The information processing apparatus includes: a first reader that has a first reading function which electrically reads a first information stored in a communication medium in a non-contact manner, a second reader that has a second reading function which electrically or magnetically reads the second information stored in a card in contact, and a touch panel that electrically detects the contact or proximity of an object as an input detection function. The information processing method includes the steps of exclusively controlling an ON/OFF of the first reading function of the first reader and an ON/OFF of the input detection function of the touch panel, based on a detection that the communication medium is placed in a predetermined position with respect to the first reader or a detection that the card is placed in a predetermined position with respect to the second reader.

According to the present invention, reading accuracy of a non-contact IC card and input detection accuracy of an electrical signal input operation can be prevented from being deteriorated even when an information stored in the non-contact IC card and an information stored in a card other than the non-contact IC card are read.

BRIEF DESCRIPTION OF DRAWINGS

FIG. 3B is a side view showing an example of the method for using the second card slot.

DESCRIPTION OF EMBODIMENTS

Hereinafter, embodiments will be described in detail with reference to the drawings. However, unnecessary detailed description may be omitted. For example, detailed description of a well-known matter or repeated description of substantially the same configuration may be omitted. This is to avoid unnecessary redundancy in the following description and to facilitate understanding for those skilled in the art. The attached diagrams and the following description are provided to enable those skilled in the art to sufficiently understand the present invention, and are not intended to limit the matters described in the scope of the claims.

Figure 1A:
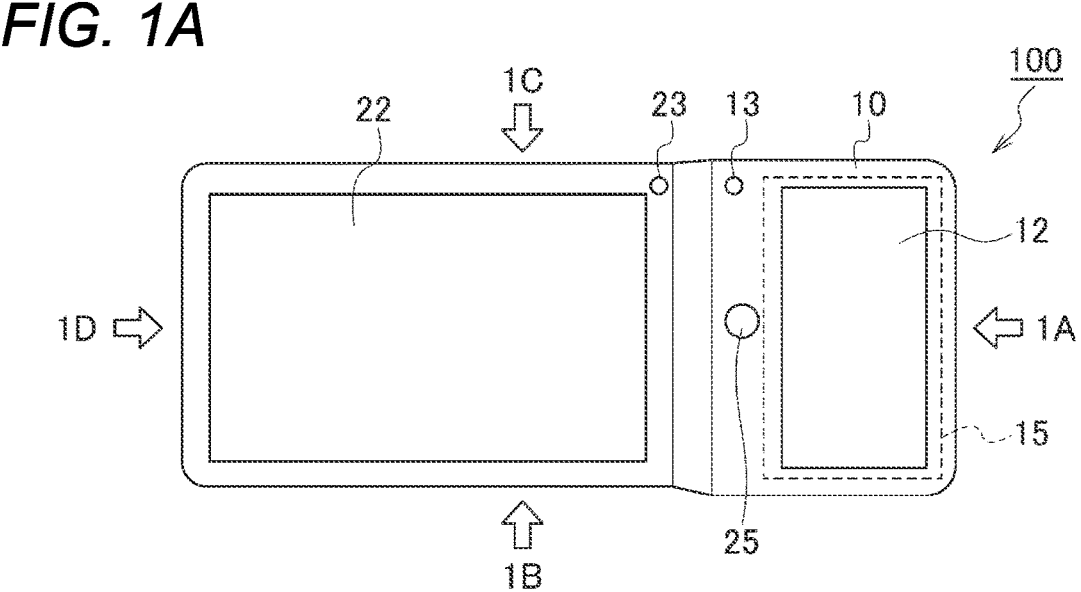
FIG. 1A is a top view showing an example of an external appearance of a payment terminal according to a first embodiment.
Figure 1B:
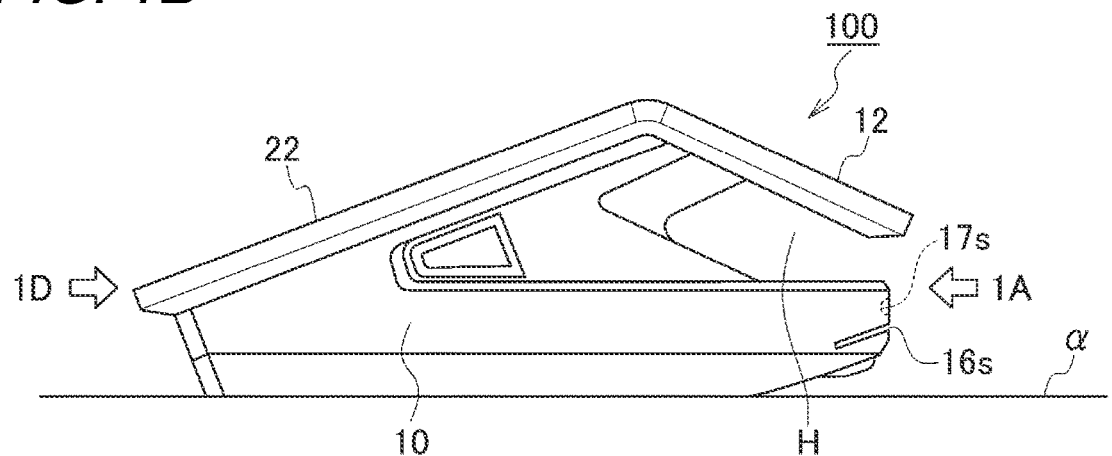
FIG. 1B is a side view showing an example of the external appearance of the payment terminal.
Figure 1C:
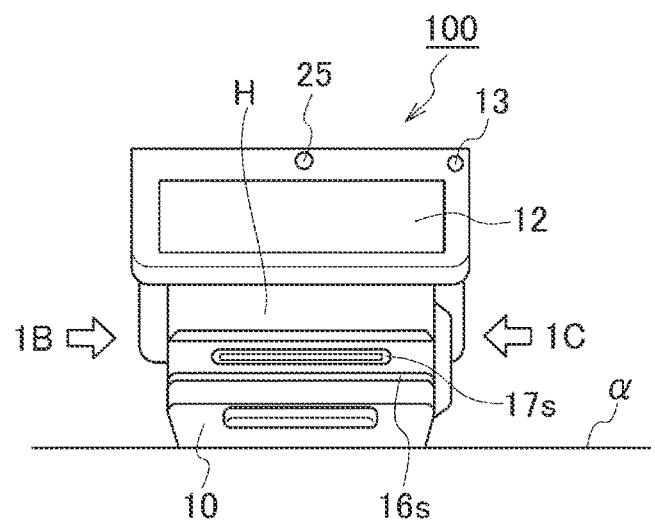
FIG. 1C is a front view showing an example of the external appearance of the payment terminal.

FIG. 1A is a top view showing an example of an external appearance of a payment terminal 100 according to a first embodiment. FIG. 1B is a side view showing an example of the external appearance of the payment terminal 100. FIG. 1C is a front view showing an example of the external appearance of the payment terminal 100.

The payment terminal 100 includes a main body 10. The main body 10 generally has, for example, a box shape. A front side 1A, a side 1B, a side 1C, a rear side 1D of the payment terminal 100 are shown in FIG. 1A, FIG. 1B, and FIG. 1C. For example, a purchaser of a commodity operates the payment terminal 100 from the front side 1A. For example, a store clerk or the like who registers purchase of the commodity operates the payment terminal 100 from the rear side 1D. The purchaser may be a customer of the store.

The payment terminal 100 includes, at the front side 1A, a first touch panel 12, a first light emitting diode (LED) 13, a near field communication (NFC) antenna 15, a first card slot 16s, a second card slot 17s, and a camera 25. The payment terminal 100 includes, at the rear side 1D, a second touch panel 22 and a second LED 23.

The payment terminal 100 is a composite terminal with which a purchaser can select a plurality of payment methods. The payment terminal 100 may be used, for example, in a state of being placed on a placement surface α of a counter of a store.

Examples of the plurality of payment methods include a credit card payment, an electronic money payment, a code (such as a QR code (registered trademark)) payment, and a cash payment. Examples of the credit card payment include a magnetic card payment, a contact IC card payment, and a non-contact IC card payment. Electronic money may include a plurality of types of electronic money. Since the electronic money payment and the non-contact IC card payment are payments using non-contact communication (such as near field communication (NFC)), the electronic money payment and the non-contact IC card payment are also collectively referred to as a non-contact payment.

The plurality of payment methods are respectively performed using a plurality of corresponding payment interfaces. Examples of the plurality of payment interfaces include a credit card, an electronic money card C32, a code, and cash. Examples of the credit card include a magnetic card C1, a contact IC card C2, and a non-contact IC credit card C31.

The magnetic card C1 is used for a payment by being inserted into the first card slot 16s. The contact IC card C2 is used for a payment by being inserted into the second card slot 17s. The non-contact IC credit card C31 and the electronic money card C32 are used for a payment by being brought close to the NFC antenna 15. The non-contact IC credit card C31 and the electronic money card C32 are also collectively referred to as a "non-contact IC card C3".

In the payment terminal 100, the first card slot 16s, the second card slot 17s, and the first touch panel 12 are arranged in this order from a side close to the placement surface α in a height direction from the placement surface α. The NFC antenna 15 is arranged around the first touch panel 12.

In the payment terminal 100, the first card slot 16s, the second card slot 17s, the first touch panel 12, and the NFC antenna 15 are collectively arranged at the front side 1A facing a purchaser. In this case, the purchaser can easily select any one of the plurality of payment methods corresponding to a plurality of devices arranged in front of the purchaser. Since the plurality of devices corresponding to the plurality of payment methods are gathered at one place, a payment according to each of the payment methods can be performed smoothly.

The second touch panel 22 is provided in the payment terminal 100. The second touch panel 22 is used by, for example, a store clerk, and is provided at the rear side 1D facing a store clerk.

The payment terminal 100 has a mountain shape at an upper portion of the payment terminal 100 as viewed from a side (see FIG. 1B). The mountain shape has a first surface and a second surface. The first surface is a surface on which the first touch panel 12 is provided, and is an operation surface for a purchaser in a payment. The second surface is a surface on which the second touch panel 22 is provided, and is an operation surface for a store clerk in a payment.

With this configuration, the purchaser and the store clerk facing each other can simultaneously operate the payment terminal 100 placed on the placement surface α. For example, when the payment terminal 100 is installed on a counter of a store, a store clerk inside the counter and a purchaser outside the counter can operate the payment terminal 100 in a state in which the store clerk and the purchaser face each other.

In the payment terminal 100, the camera 25, and the first LED 13 are arranged at the front side 1A. At the front side 1A, although the camera 25 and the first LED 13 may be arranged at the rear side 1D relative to the first touch panel 12, that is, at a top side of the mountain shape, arrangement positions of the camera 25 and the first LED 13 are not limited thereto.

In the payment terminal 100, the second LED 23 is arranged at the rear side 1D. At the rear side 1D, although the second LED 23 may be arranged at the front side 1A relative to the second touch panel 22, that is, at a top side of the mountain shape, an arrangement position of the second LED 23 is not limited thereto.

Although the first touch panel 12 and the second touch panel 22 are shown as input devices for a store clerk and a purchaser, the payment terminal 100 may include other input devices (for example, physical keys or buttons).

The payment terminal 100 includes a security protection area SR (see FIG. 7) in a part of the payment terminal 100. The security protection area SR is an area where security is increased compared with an area other than the security protection area SR in the payment terminal 100. For example, the security protection area SR has a tamper resistance. Security of the security protection area SR may be logically enhanced by a software processing, or may be physically enhanced by a structure or mechanism of hardware. The security protection area SR mainly stores a member used for a payment processing using a card or the like.

Figure 2A:
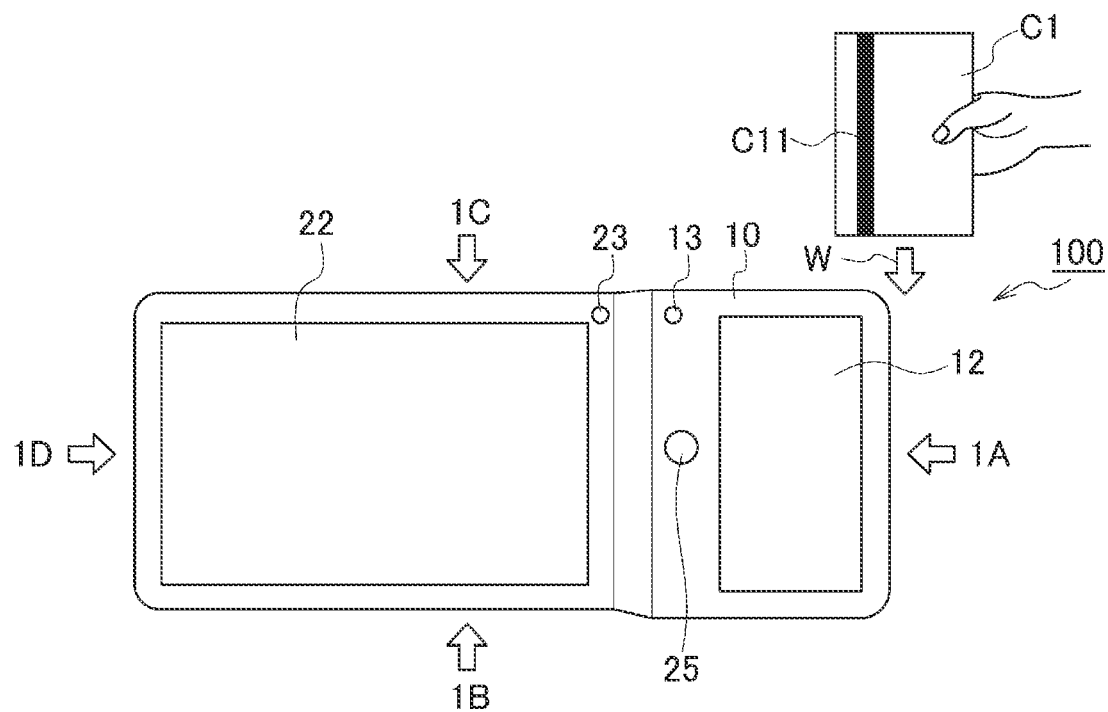
FIG. 2A is a top view showing an example of a method for using a first card slot.
Figure 2B:
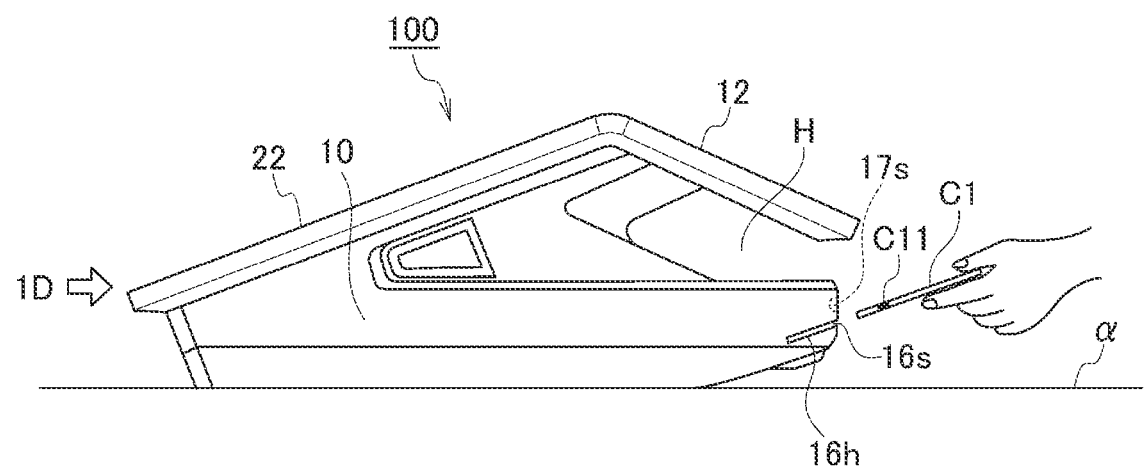
FIG. 2B is a side view showing an example of the method for using the first card slot.

FIG. 2A is a top view showing an example of a method for using the first card slot 16s provided in the payment terminal 100. FIG. 2B is a side view showing an example of the method for using the first card slot 16s provided in the payment terminal 100.

For example, a purchaser is at a position facing the front side 1A (a front surface) of the payment terminal 100, and swipes the magnetic card C1 in the first card slot 16s in a direction w substantially parallel to the placement surface α. The magnetic card C1 includes at least one magnetic stripe C11. On the other hand, a first card reader 16 (see FIG. 7) having the first card slot 16s is provided with a magnetic head 16h. Data is read and written between the payment terminal 100 and the magnetic card C1 by bringing the magnetic stripe C11 into contact with the magnetic head 16h.

Figure 3A:
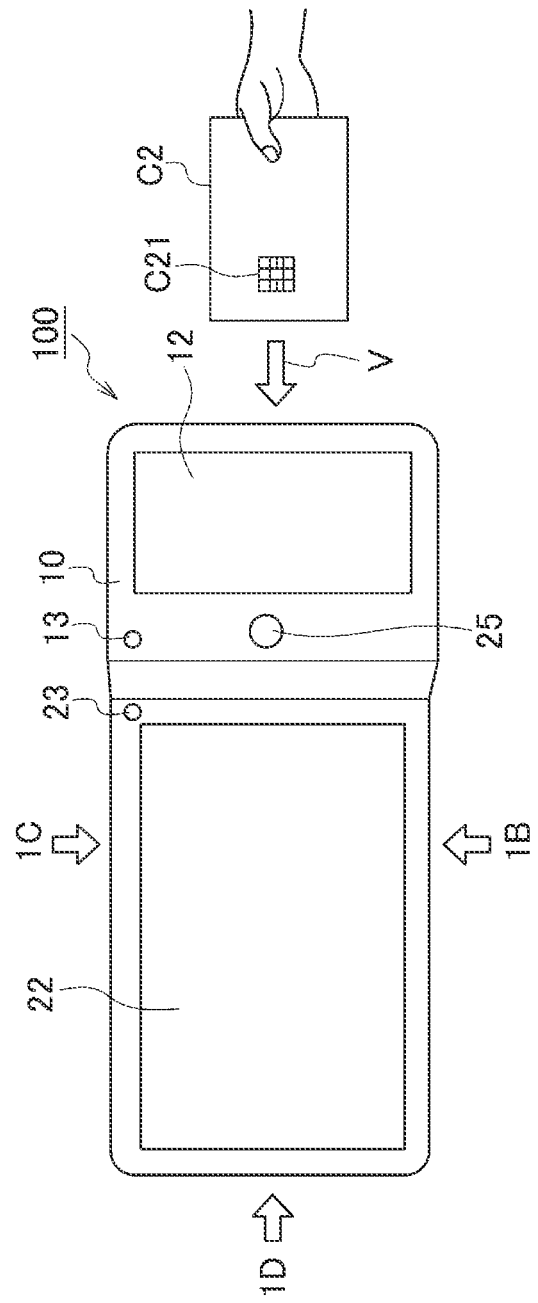
FIG. 3A is a top view showing an example of a method for using a second card slot.

FIG. 3A is a top view showing an example of a method for using the second card slot 17s provided in the payment terminal 100. FIG. 3B is a side view showing an example of the method for using the second card slot 17s provided in the payment terminal 100. A purchaser inserts the contact IC card C2 in a direction v substantially parallel to the placement surface α. The contact IC card C2 includes an IC chip having a terminal C21. On the other hand, the second card slot 17s includes a contact terminal (not shown) therein. Data is read and written between the payment terminal 100 and the contact IC card C2 by bringing the terminal C21 of the IC chip into contact with the contact terminal.

Figure 4A:
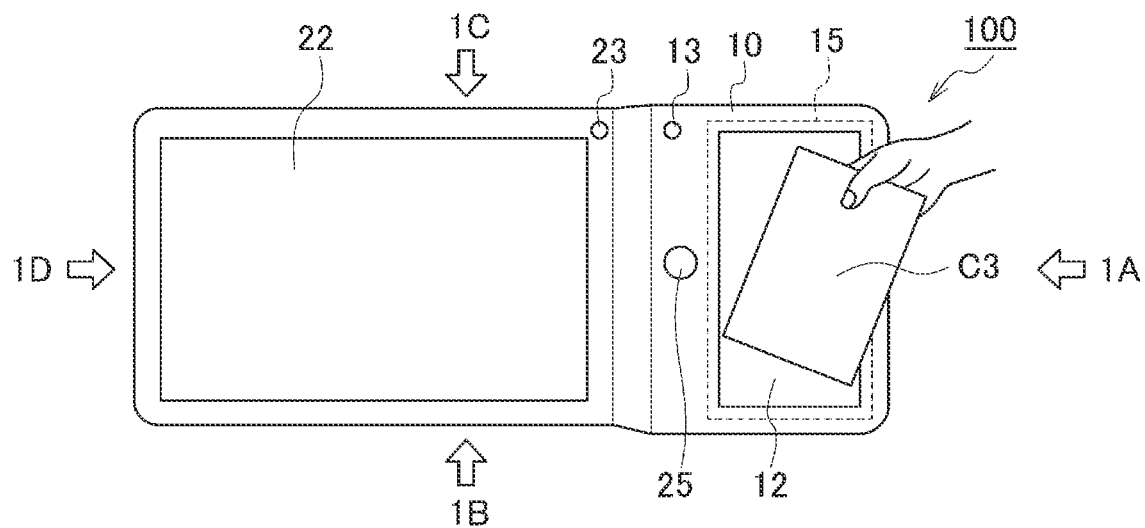
FIG. 4A is a top view showing an example of a method for making a non-contact payment using the payment terminal.
Figure 4B:
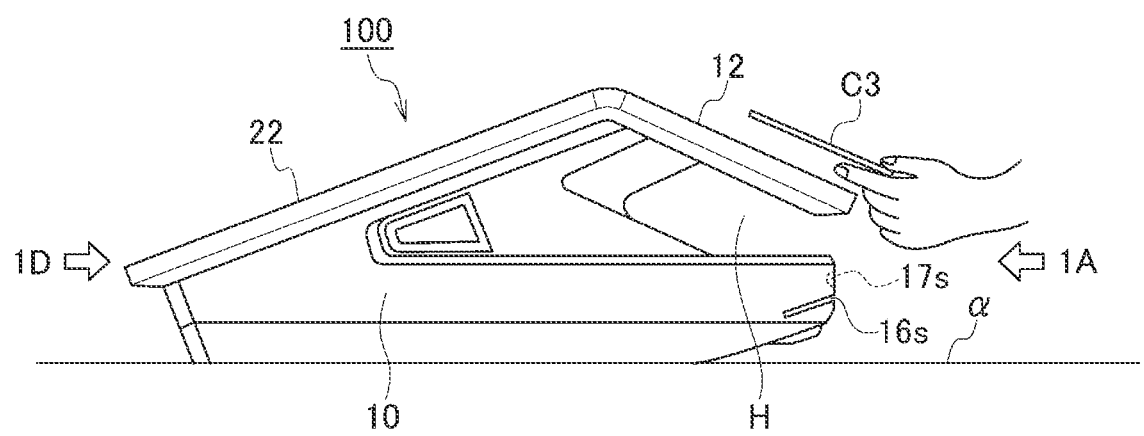
FIG. 4B is a side view showing an example of the method for making the non-contact payment using the payment terminal.

FIG. 4A is a top view showing an example of a method for making a non-contact payment using the payment terminal 100. FIG. 4B is a side view showing an example of the method for making the non-contact payment using the payment terminal 100.

When a non-contact payment is made, non-contact communication is performed between an IC chip of the non-contact IC card C3 and the NFC antenna 15 of the payment terminal 100 by bringing the non-contact IC card C3 into contact with or close to the NFC antenna 15 by a purchaser. Accordingly, data is read and written between the payment terminal 100 and the non-contact IC card C3.

Figure 5:
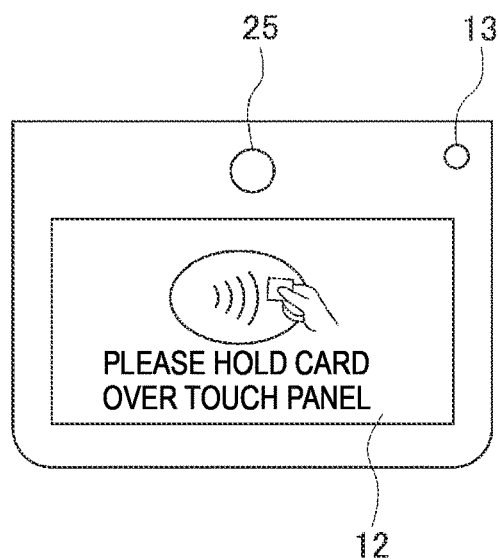
FIG. 5 is a view showing an example of a touch panel.

FIG. 5 is a view showing an example of a periphery of the first touch panel 12.

As shown in FIG. 5, the first touch panel 12 may be provided over the entire surface on which the first touch panel 12 is provided, or may be provided on a part of the surface. The first touch panel 12 has a display function of displaying various kinds of data, information, or images. Therefore, the first touch panel 12 can provide visual information to a purchaser. On the first touch panel 12, an input detection area where an input operation is detected and a display area where various kinds of displays are performed may be the same area, or at least a part of the input detection area and the display area may be different areas.

Figure 6:
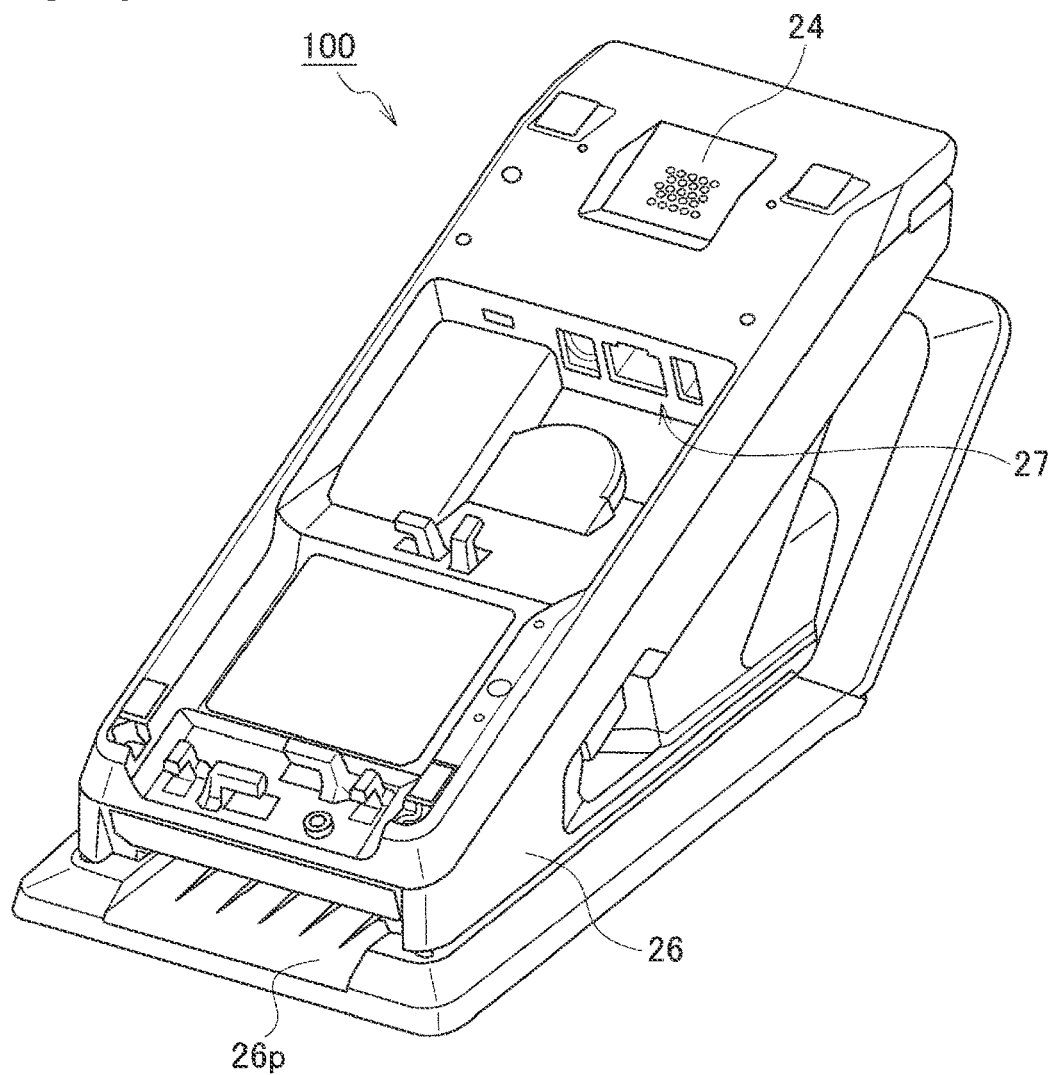
FIG. 6 is a rear perspective view showing an example of the external appearance of the payment terminal.

FIG. 6 is a rear perspective view showing an example of the external appearance of the payment terminal 100. At a back surface side (a surface side in contact with the placement surface α), the payment terminal 100 includes a speaker 24, a printer 26, a printer discharge outlet 26p, an external terminal 27, and the like.

Figure 7:
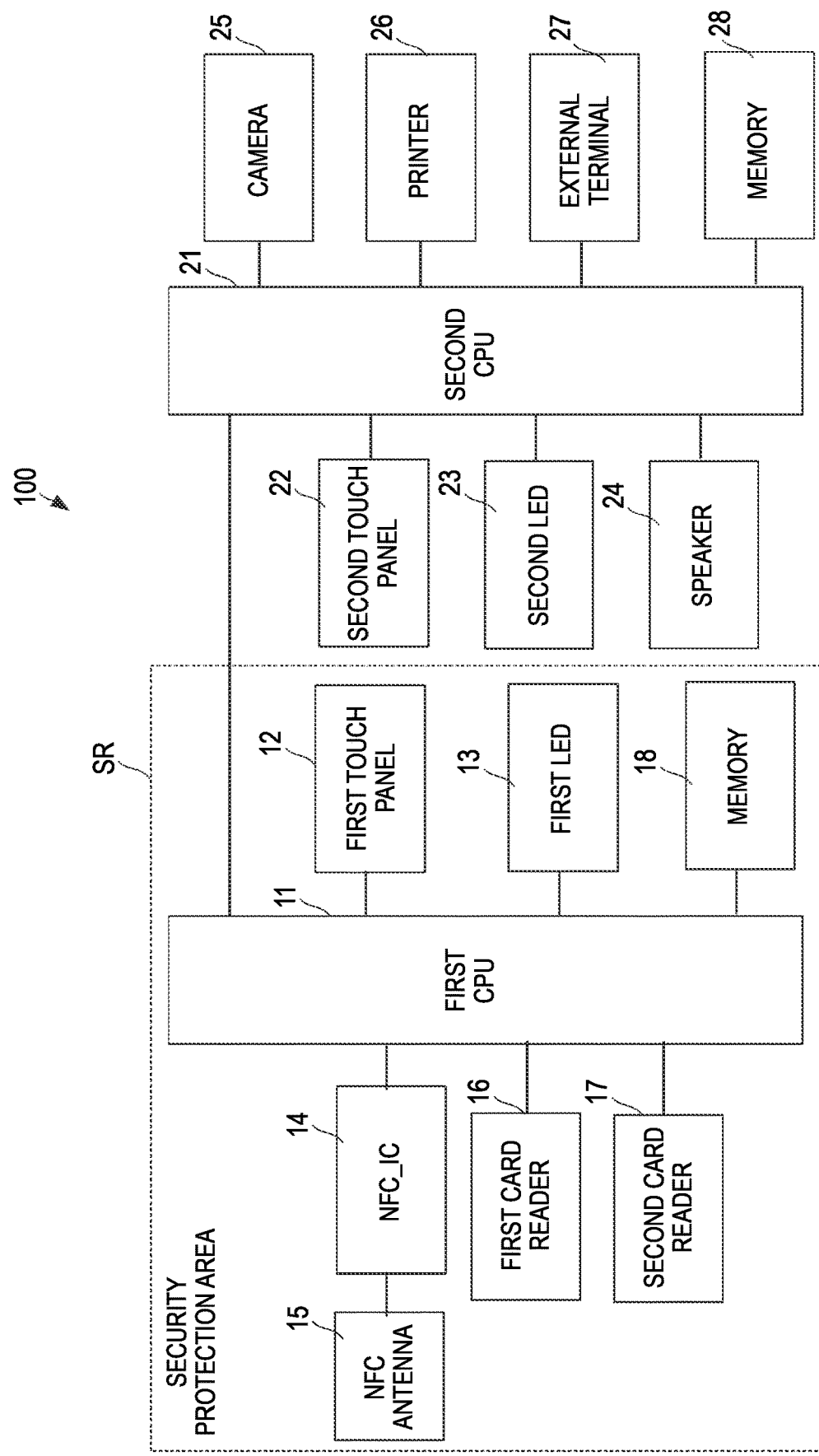
FIG. 7 is a block diagram showing an example of an electrical configuration of the payment terminal.

FIG. 7 is a block diagram showing an example of an electrical configuration of the payment terminal 100.

The payment terminal 100 includes the security protection area SR. In the security protection area SR, the payment terminal 100 includes a first central processing unit (CPU) 11, the first touch panel 12, the first LED 13, an NFC_IC 14, the NFC antenna 15, the first card reader 16, a second card reader 17, and a memory 18. Outside the security protection area SR, the payment terminal 100 includes a second CPU 21, the second touch panel 22, the second LED 23, the speaker 24, the camera 25, the printer 26, the external terminal 27, and a memory 28.

The first CPU 11 implements various functions by executing a program stored in the memory 18. The first CPU 11 collectively controls devices in the security protection area SR. The first CPU 11 executes a payment processing related to a credit card payment, an electronic money payment, and the like. The first CPU 11 functions as a payment CPU that executes a payment processing related to a payment. The first CPU 11 sends data to and receives data from the second CPU 21 and cooperates with the second CPU 21. The first CPU 11 is an example of a processor, and may be another processor.

The first touch panel 12 has an input detection function that electrically detects an input (an input operation) of bringing a finger of a purchaser (an example of an object) into contact with or close to the first touch panel 12. For example, the first touch panel 12 receives the input operation from the purchaser. For example, the first touch panel 12 receives a PIN input operation or an electronic signature operation in a credit card payment.

The first touch panel 12 is formed by stacking a glass substrate, a transparent electrode, a protective cover, and the like. A method for detecting an input operation by the first touch panel 12 includes a resistive film method, an electrostatic capacitance method, an electromagnetic induction method, and the like. Any one of the methods may be adopted as long as the method can electrically detect an input operation.

The first LED 13 performs a display for notifying various kinds of information. The first LED 13 may perform a display in various display modes. Examples of the display modes may include a display color (for example, red, green, and blue), display timing (for example, a display during a payment processing and a display during completion of a payment), and a display pattern (for example, lighting, blinking, and lighting-off).

The NFC_IC 14 performs a processing on the NFC antenna 15. For example, the NFC_IC 14 controls power supply to the NFC antenna 15 and data communication via the NFC antenna 15.

The NFC antenna 15 is formed of, for example, a loop coil. The NFC antenna 15 receives power supply from the NFC_IC 14 and generates radio waves. An area within a predetermined distance from the NFC antenna 15 is an area where non-contact communication with the NFC antenna 15 can be performed (a non-contact communicable area). When the non-contact IC card C3 (an example of a communication media capable of non-contact communication) is arranged in the non-contact communicable area, radio waves from the NFC antenna 15 arrives at the non-contact IC card C3, and the NFC antenna 15 applies start-up power to the non-contact IC card C3. Accordingly, the NFC antenna 15 exchanges data with the non-contact IC card C3.

A central position of a surface defined by the NFC antenna 15 may substantially coincide with a central position of a surface defined by the first touch panel 12. Accordingly, data can be exchanged between the NFC antenna 15 and the non-contact IC card C3 by holding the non-contact IC card C3 over the first touch panel 12, and the operation can be easily understood by a user.

When the NFC antenna 15 is arranged around the first touch panel 12, a transparent electrode of the first touch panel 12 and the NFC antenna 15 are arranged close to each other. Therefore, when the first touch panel 12 and the NFC antenna 15 are used at the same time, the first touch panel 12 and the NFC antenna 15 may electrically interfere with each other.

The NFC_IC 14 acquires (reads) an information stored in the non-contact IC credit card C31 via the NFC antenna 15. The NFC_IC 14 sends the acquired information to the first CPU 11 as a non-contact read information. The information stored in the non-contact IC credit card C31 and the non-contact read information include, for example, an identification number of a credit card. The NFC_IC 14 acquires (reads) an information stored in the electronic money card C32 via the NFC antenna 15. The NFC_IC 14 sends the acquired information to the first CPU 11 as an electronic money read information. The information stored in the electronic money card C32 and the electronic money read information include, for example, an identification number of the electronic money card C32.

The first card reader 16 is a magnetic card reader. The first card reader 16 reads an information stored in the magnetic card C1 and sends the read information to the first CPU 11 as a magnetic read information. The information stored in the magnetic card C1 and the magnetic read information include, for example, an identification number of a credit card.

Figure 8:
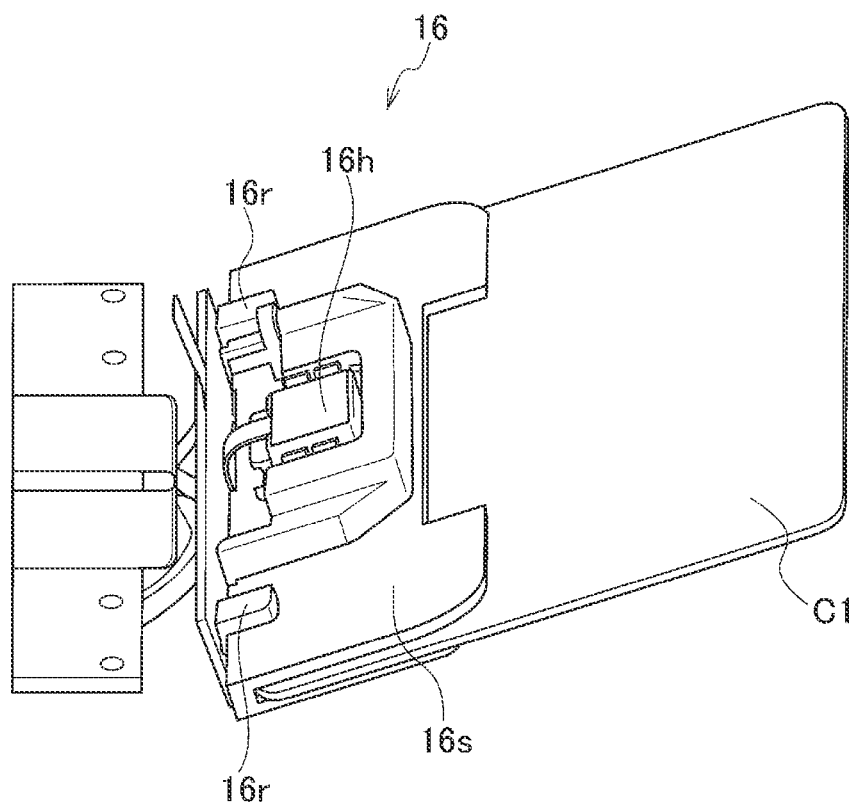
FIG. 8 is a schematic diagram showing an example of an internal configuration of a first card reader.

The first card reader 16 includes the magnetic head 16*h*, the first card slot 16*s*, and a first insertion sensor 16*r* (see FIG. 8). The magnetic head 16*h* faces the magnetic stripe C11 of the inserted (swiped) magnetic card C1, and magnetically reads an information stored in the magnetic card C1. When the magnetic card C1 is inserted, the first card slot 16*s* guides each portion of the magnetic stripe C11 in which the information in the magnetic card C1 is embedded toward the magnetic head 16*h*. The first insertion sensor 16*r* detects that the magnetic card C1 is inserted into the first card slot 16*s* for swiping. The first insertion sensor 16*r* may be, for example, a transmission type photo-interrupter. The first insertion sensor 16*r* may be arranged between a place where insertion (swiping) of the magnetic card C1 is started and the magnetic head 16*h*. When the first insertion sensor 16*r* detects that the magnetic card C1 is inserted into the first insertion sensor 16*r*, the first insertion sensor 16*r* sends, to the first CPU 11, a first insertion detection information indicating that the magnetic card C1 is inserted into the first insertion sensor 16*r*.

The second card reader 17 is a contact IC card reader. The second card reader 17 reads an information stored in the contact IC card C2 and sends the read information to the first CPU 11 as a contact read information. The information stored in the contact IC card C2 and the contact read information include, for example, an identification number of a credit card.

The second card reader 17 includes the second card slot 17*s*, a second insertion sensor, and a contact terminal. The contact terminal is brought into contact with a terminal of an IC chip provided in the contact IC card C2 and reads an information stored in the contact IC card C2. When the contact IC card C2 is inserted, the second card slot 17*s* guides the IC chip in which the information in the contact IC card C2 is embedded toward the contact terminal. The second insertion sensor may be, for example, a transmission type photo-interrupter. The second insertion sensor may be arranged between a place where an insertion of the contact IC card C2 is started and the contact terminal. The second insertion sensor detects that the contact IC card C2 is inserted into the second card slot 17*s*. When the second insertion sensor detects that the contact IC card C2 is inserted into the second insertion sensor, the second insertion sensor sends, to the first CPU 11, a second insertion detection information indicating that the contact IC card C2 is inserted into the second insertion sensor.

The memory 18 may include a read only memory (ROM), a random access memory (RAM), or the like. The memory 18 stores various kinds of data, information, and programs.

The second CPU 21 implements various functions by executing a program stored in the memory 28. The second CPU 21 collectively controls devices outside the security protection area SR. The second CPU 21 executes a processing related to a code payment and a cash payment, a processing other than a payment processing related to a payment, and the like. Therefore, the second CPU 21 functions as a general-purpose CPU that executes a general-purpose processing. The second CPU 21 sends data to and receives data from the first CPU 11 and cooperates with the first CPU 11. The second CPU 21 is an example of a processor, and may be another processor.

The second touch panel 22 receives, for example, an input operation from a store clerk. For example, an amount of money for a commodity purchase is input or the number of purchased commodities is input. The second CPU 21 calculates a payment amount based on the amount of money of a commodity, the number of purchased commodities, or the like. A configuration of the second touch panel 22 may be the same as that of the first touch panel 12.

The second LED 23 performs a display for notifying various kinds of information. The second LED 23 may perform a display in various display modes. Examples of the display modes may include a display color (for example, red, green, and blue), display timing (for example, a display during an input operation of a purchase information), and a display pattern (for example, lighting, blinking, and lighting-off).

The speaker 24 outputs various sounds. For example, the speaker 24 outputs a sound related to a processing of the payment terminal 100.

The camera 25 images an object and obtains a captured image. For example, the camera 25 images a two-dimensional code or the like displayed on a mobile terminal of a purchaser, and sends the captured image to the second CPU 21. The second CPU 21 analyzes the captured image and recognizes an identification information necessary for a payment indicated by the two-dimensional code or the like.

The printer 26 outputs, for example, an information related to a processing (for example, a payment processing) in the payment terminal 100 to a paper medium. For example, after the payment processing, the printer 26 may print out a result of the payment processing on a receipt or the like. A paper on which the printer 26 performed printing is discharged from the printer discharge outlet 26*p* to an outside of the payment terminal 100.

Various cables (for example, a local area network (LAN) cable and a universal serial bus (USB) cable) can be connected to the external terminal 27. Accordingly, various external devices (for example, a POS and a cash drawer) can be connected to and communicate with the external terminal 27 via the various cables. Therefore, the external terminal 27 functions as a communication device. The communication device may perform wireless communication (for example, wireless LAN communication or Bluetooth (registered trademark) communication) without using the external terminal 27.

The memory 28 may include a ROM, a RAM, and the like. The memory 28 stores various kinds of data, information, and programs.

Next, ON/OFF control of each device by the first CPU 11 will be described. Devices that are ON/OFF controlled by the first CPU 11 include, for example, the first touch panel 12, the NFC_IC 14, the first card reader 16, and the second card reader 17.

The first touch panel 12 turns on or turns off an input detection function under the control of the first CPU 11. When the input detection function is turned on, the first touch panel 12 can detect an input operation of a purchaser. When the input detection function is turned off, the first touch panel 12 cannot detect an input operation of a purchaser. For example, the first touch panel 12 may turn on the input detection function by setting the first touch panel 12 to an active state. The first touch panel 12 may turn off the input detection function by setting the first touch panel 12 to a sleep state. For example, the first touch panel 12 may turn on the input detection function by permitting power supply to the transparent electrode. The first touch panel 12 may turn off the input detection function by prohibiting power supply to the transparent electrode. The ON/OFF of the input detection function is also simply referred to as ON/OFF of the first touch panel 12.

The NFC_IC 14 turns on or turns off a non-contact communication function under the control of the first CPU 11. When the non-contact communication function is turned on, the NFC_IC 14 can perform non-contact communication with the non-contact IC card C3 and the electronic money card C32, and can read the information stored in the non-contact IC card C3 and the information stored in the electronic money card C32. When the non-contact communication function is turned off, the NFC_IC 14 cannot perform non-contact communication with the non-contact IC card C3 and the electronic money card C32, and cannot read the information stored in the non-contact IC card C3 and the information stored in the electronic money card C32. For example, the NFC_IC 14 may turn on the non-contact communication function by permitting power supply to the NFC antenna 15. The NFC_IC 14 may turn off the non-contact communication function by prohibiting power supply to the NFC antenna 15. The ON/OFF of the non-contact communication function is also simply referred to as ON/OFF of the NFC_IC 14.

The first card reader 16 turns on or turns off a first reading function for reading the magnetic card C1 under the control of the first CPU 11. When the first reading function is turned on, the first card reader 16 can read the magnetic card C1. When the first reading function is turned off, the first card reader 16 cannot read the magnetic card C1. For example, the first card reader 16 may turn on the first reading function by permitting power supply to an IC for reading magnetism. The first card reader 16 may turn off the first reading function by prohibiting power supply to the IC for reading magnetism. The ON/OFF of the first reading function is also simply referred to as ON/OFF of the first card reader 16.

The second card reader 17 turns on or turns off a second reading function for reading the contact IC card C2 under the control of the first CPU 11. When the second reading function is turned on, the second card reader 17 can read the contact IC card C2. When the second reading function is turned off, the second card reader 17 cannot read the contact IC card C2. For example, the second card reader 17 may turn on the second reading function by permitting power supply to the contact terminal. The second card reader 17 may turn off the second reading function by prohibiting power supply to the contact terminal. The ON/OFF of the second reading function is also simply referred to as ON/OFF of the second card reader 17.

The first CPU 11 may determine to turn on a device and turn off a device based on a payment interface or a payment method. Alternatively, the first CPU 11 may determine to turn on a device and turn off a device based on a payment processing (for example, whether a payment processing is completed). In particular, electrical interference is likely to occur between the first touch panel 12 and the NFC antenna 15 that are arranged close to each other. Therefore, the first CPU 11 controls the ON/OFF of the first touch panel 12 and the ON/OFF of the NFC_IC 14 that controls the NFC antenna 15. In this case, it is preferable that the first CPU 11 exclusively controls the ON/OFF of the first touch panel 12 and the ON/OFF of the NFC_IC 14. Specifically, when the first touch panel 12 is turned on, it is preferable to control the NFC_IC 14 to be turned off. When the first touch panel 12 is turned off, it is preferable to control the NFC_IC 14 to be turned on.

The first CPU 11 may perform an ON/OFF control for each device when a card for a payment is detected. In an ON/OFF control of each device, the first CPU 11 turns on a device determined to be turned on and turns off a device determined to be turned off. For example, the first CPU 11 may set the ON/OFF of each device assuming that the magnetic card C1 is detected as a card for a payment when the first insertion detection information is acquired from the first card reader 16. For example, the first CPU 11 may set the ON/OFF of each device assuming that the contact IC card C2 is detected as a card for a payment when the second insertion detection information is acquired from the second card reader 17. For example, the first CPU 11 may set the ON/OFF of each device assuming that the non-contact IC card C3 is detected as a card for a payment when the non-contact read information is acquired from the NFC_IC 14.

Figure 9:
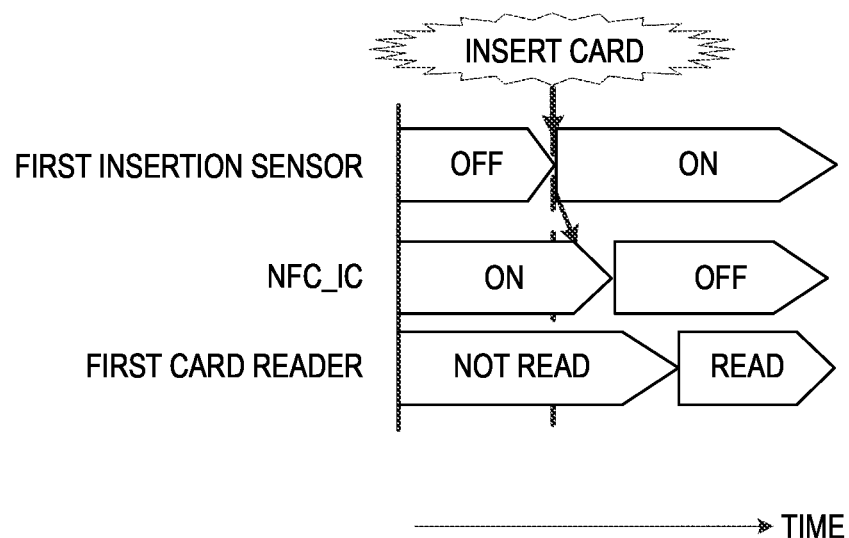
FIG. 9 is a diagram showing an example of an ON/OFF state of NFC_IC based on a detection of a magnetic card.

FIG. 9 is a diagram showing an example of an ON/OFF state of the NFC_IC 14 based on a detection of the magnetic card C1.

When the first insertion sensor 16r of the first card reader 16 detects insertion of the magnetic card C1, the first card reader 16 sends the first insertion detection information to the first CPU 11. When the first CPU 11 acquires the first insertion detection information from the first card reader 16, the first CPU 11 turns off the non-contact communication function of the NFC_IC 14. After the non-contact communication function of the NFC_IC 14 is turned off, the first card reader 16 reads, by the magnetic head, the information stored in the magnetic card C1.

Therefore, when the magnetic card C1 is read, no radio wave is transmitted from the NFC antenna 15 since the non-contact communication function of the NFC_IC 14 is turned off. Therefore, the payment terminal 100 can prevent electromagnetic interference (at least one of electrical interference and magnetic interference) from occurring between magnetic reading of the magnetic card C1 and reading of the non-contact IC card C3 by non-contact communication. Therefore, the payment terminal 100 can improve reading accuracy of the magnetic card C1.

Although FIG. 9 shows an example of reading the magnetic card C1, the same applies to reading of the contact IC card C2.

That is, when the insertion sensor of the second card reader 17 detects insertion of the contact IC card C2, the second card reader 17 sends the second insertion detection information to the first CPU 11. When the first CPU 11 acquires the second insertion detection information from the second card reader 17, the first CPU 11 turns off the non-contact communication function of the NFC_IC 14.

After the non-contact communication function of the NFC_IC 14 is turned off, the second card reader 17 reads, by the contact terminal, the information stored in the contact IC card C2.

Therefore, when the contact IC card C2 is read, no radio wave is transmitted from the NFC antenna 15 since the non-contact communication function of the NFC_IC 14 is turned off. Therefore, the payment terminal 100 can prevent electromagnetic interference from occurring between electrical reading of the contact IC card C2 and reading of the non-contact IC card C3 by non-contact communication. Therefore, the payment terminal 100 can improve reading accuracy of the contact IC card C2.

Next, an operation example of the payment terminal 100 will be described.

Figure 10:
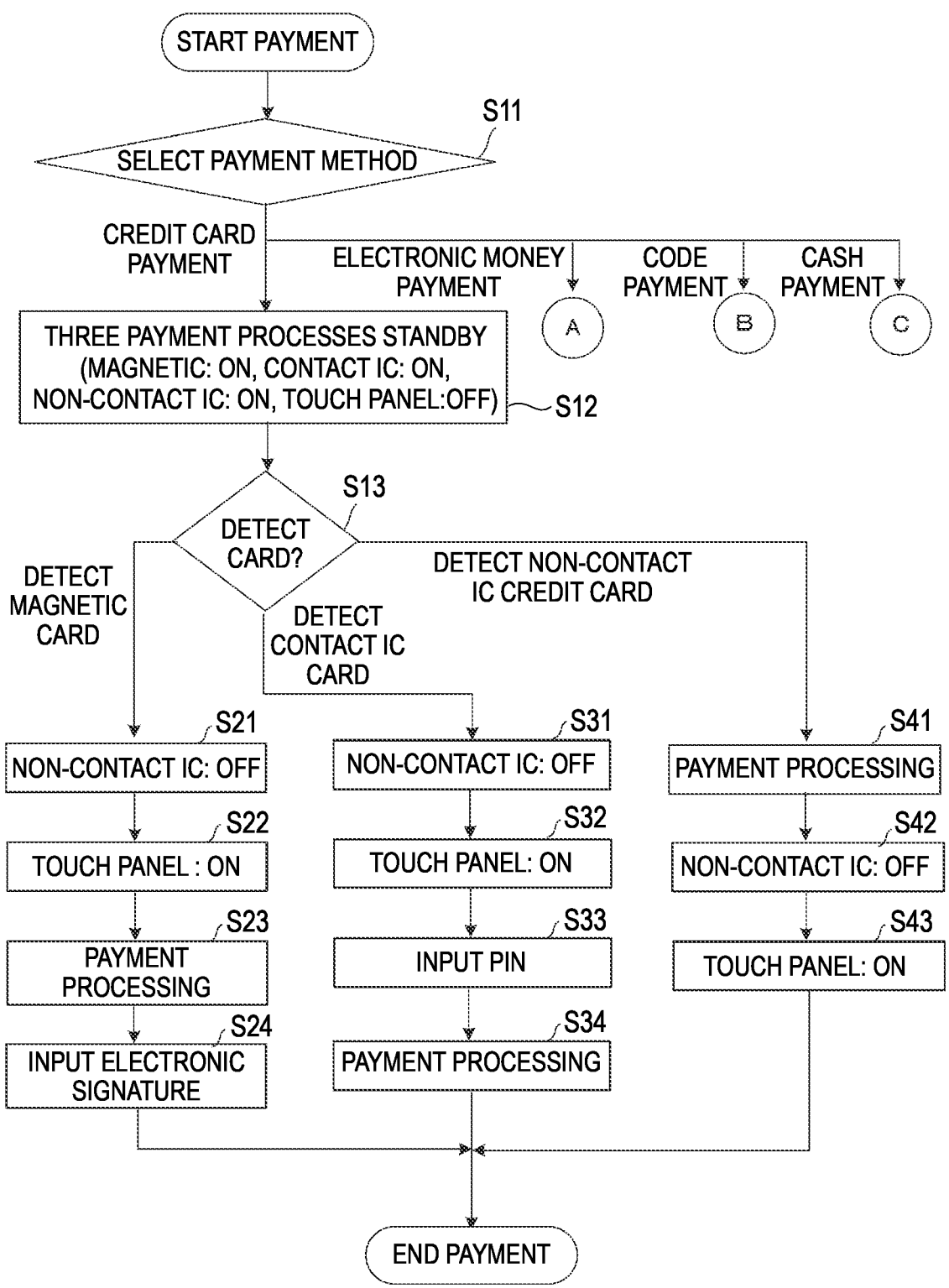
FIG. 10 is a flowchart showing an operation example of the payment terminal.
Figure 11:
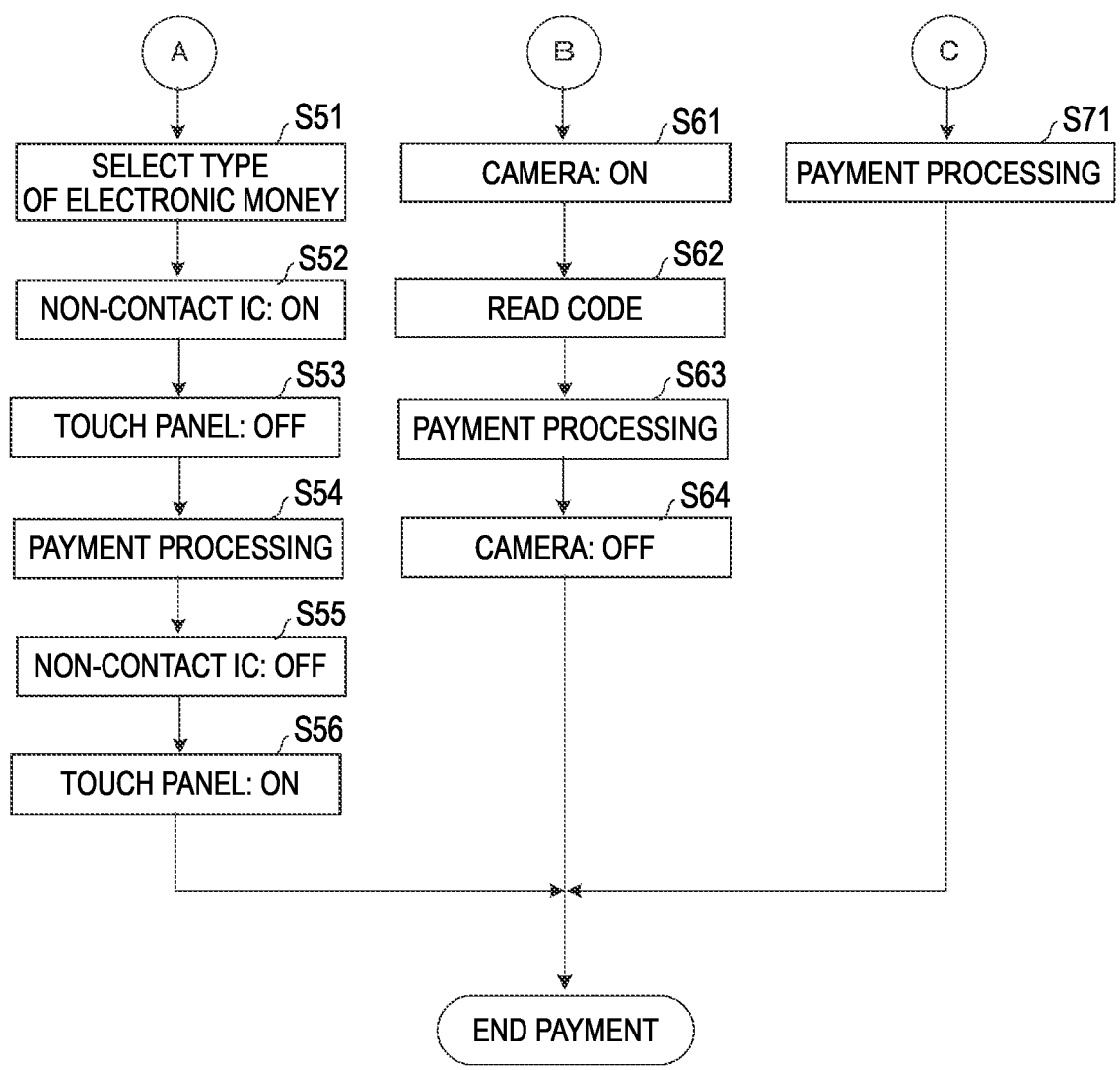
FIG. 11 is a flowchart (continuation of FIG. 10) showing the operation example of the payment terminal.

FIGS. 10 and 11 are flowcharts showing an operation example of the payment terminal 100.

First, the second CPU 21 selects a payment method (S11). In this case, for example, a store clerk operates the second touch panel 22, the second touch panel 22 receives an input operation, and the second CPU 21 selects a payment method according to the input operation.

When a credit card payment is selected, the first CPU 11 sets the ON/OFF of each device for three payment processes standby. The three payment processes standby is a state in which the payment terminal 100 can read any one of three cards (the magnetic card C1, the contact IC card C2, and the non-contact IC credit card C31) having a credit card function. Specifically, the first CPU 11 turns on the first card reader 16 (magnetic: ON), turns on the second card reader 17 (contact IC: ON), and turns on the NFC_IC 14 (non-contact IC: ON) (S12). In this case, the first CPU 11 turns off the first touch panel 12 (touch panel: OFF) (S12).

Accordingly, the non-contact communication by the NFC_IC 14 and an electrical input detection by the first touch panel 12 can be prevented from interfering with each other. In other words, the payment terminal 100 can simultaneously activate a plurality of payment methods.

The first CPU 11 determines whether any one of the three credit cards is detected in a three payment processes standby state (S13).

When the first CPU 11 acquires the first insertion detection information, that is, when the first CPU 11 detects the magnetic card C1, a payment is made by the magnetic card C1. In this case, the first CPU 11 turns off the NFC_IC 14 (non-contact IC: OFF) (S21). The first touch panel is turned on (touch panel: ON) (S22).

In the ON/OFF state of each device as described above, the first card reader 16 reads the information stored in the magnetic card C1 and sends a magnetic read information to the first CPU 11. The first CPU 11 and the second CPU 21 execute a payment processing using the magnetic read information (S23). The first CPU 11 and the second CPU 21 of the payment terminal 100 and a payment server of a payment center cooperate with each other to execute the payment processing.

For example, the following processes are executed in the payment processing. The first CPU 11 encrypts the magnetic read information and sends the magnetic read information to the second CPU 21. The second CPU 21 transmits a payment request information including the encrypted magnetic read information to the payment server via the communication device. The payment request information may include an identification number of a credit card, a payment amount, and the like. The payment server receives the payment request information from the payment terminal 100, collates the payment request information with an information stored in the payment server, and determines whether to permit a payment by the magnetic card C1 attempting to make a payment. When the payment is permitted, the payment server executes the payment by the magnetic card C1 and completes a transaction of a commodity purchase. The payment server transmits a payment completion notification to the payment terminal 100. When the payment completion notification is received via the communication device, the second CPU 21 sends the payment completion notification to the first CPU 11. When the first CPU 11 receives the payment completion notification from the second CPU 21, the first CPU 11 ends the payment processing. A flow of the payment processing is not limited to this example.

After the payment processing using the magnetic read information is completed, the first touch panel 12 receives an input operation of an electronic signature from a purchaser, detects the input operation of the electronic signature, and sends the electronic signature to the first CPU 11 (S24). The first CPU 11 sends the electronic signature to the second CPU 21 with or without encryption of the electronic signature. The second CPU 21 transmits the electronic signature to the payment server via the communication device.

According to such a magnetic card payment, the NFC_IC 14 is turned off before the payment processing, so that the payment terminal 100 can prevent the magnetic card C1 from being electrically read by mistake by the NFC_IC 14, and prevent an erroneous payment. Interference between the first touch panel 12 and the non-contact communication by the NFC antenna 15 can be prevented, and the first touch panel 12 can receive an input operation of an electronic signature.

In S13, when the first CPU 11 acquires the second insertion detection information, that is, when the first CPU 11 detects the contact IC card C2, a payment is made by the contact IC card C2. In this case, the first CPU 11 turns off the NFC_IC 14 (non-contact IC: OFF) (S31), and turns on the first touch panel (touch panel: ON) (S32).

In the ON/OFF state of each device as described above, the second card reader 17 reads the information stored in the contact IC card C2 and sends a contact read information to the first CPU 11. The first touch panel 12 receives an input operation of a PIN from a purchaser, detects the input operation of the PIN, and sends the PIN to the first CPU 11 (S33).

The first CPU 11 and the second CPU 21 execute a payment processing using the contact read information and the PIN (S34). The first CPU 11 and the second CPU 21 of the payment terminal 100 and the payment server of the payment center cooperate with each other to execute the payment processing.

For example, the following processes are executed in the payment processing. The first CPU 11 encrypts the contact read information and the PIN and sends the contact read information and the PIN to the second CPU 21. The second CPU 21 transmits a payment request information including the encrypted contact read information and the PIN to the payment server via the communication device. The payment request information may include an identification number of a credit card, a payment amount, a PIN, and the like. The payment server receives the payment request information from the payment terminal 100, collates the payment request information with an information stored in the payment server, and determines whether to permit a payment by the contact IC card C2 attempting to make a payment. When the payment is permitted, the payment server executes the payment by the contact IC card C2 and completes a transaction of a commodity purchase. The payment server transmits a payment completion notification to the payment terminal 100. When the payment completion notification is received via the communication device, the second CPU 21 sends the payment completion notification to the first CPU 11. When the first CPU 11 receives the payment completion notification from the second CPU 21, the first CPU 11 ends the payment processing. A flow of the payment processing is not limited to this example.

According to such a contact IC card payment, the NFC_IC 14 is turned off before the payment processing, so that the payment terminal 100 can prevent the contact IC card C2 from being electrically read by mistake by the NFC_IC 14, and prevent an erroneous payment. Interference between the first touch panel 12 and the non-contact communication by the NFC antenna 15 can be prevented and the first touch panel 12 can receive an input operation of a PIN.

In S13, when the first CPU 11 acquires the non-contact read information and when the first CPU 11 detects the non-contact IC credit card C31, a payment is made by the non-contact IC credit card C31. In this case, the first CPU 11 and the second CPU 21 execute a payment processing using the non-contact read information in an ON/OFF state of each device that is the same as the ON/OFF state of each device during three payment processes standby (S41). The first CPU 11 and the second CPU 21 of the payment terminal 100 and a payment server of a payment center are cooperated with each other to execute the payment processing.

For example, the following processes are executed in the payment processing. The first CPU 11 encrypts the non-contact read information and sends the non-contact read information to the second CPU 21. The second CPU 21 transmits a payment request information including the encrypted non-contact read information to the payment server via the communication device. The payment request information may include an identification number of a credit card, a payment amount, and the like. The payment server receives the payment request information from the payment terminal 100, collates the payment request information with an information stored in the payment server, and determines whether to permit a payment by the non-contact IC credit card C31 attempting to make a payment. When the payment is permitted, the payment server executes the payment by the non-contact IC credit card C31 and completes a transaction of a commodity purchase. The payment server transmits a payment completion notification to the payment terminal 100. When the payment completion notification is received via the communication device, the second CPU 21 sends the payment completion notification to the first CPU 11. When receiving the payment completion notification from the second CPU 21, the first CPU 11 ends the payment processing. A flow of the payment processing is not limited to this example.

After the payment processing using the non-contact read information is completed, the first CPU 11 turns off the NFC_IC 14 (non-contact IC: OFF) (S42). The first touch panel 12 is turned on (touch panel: ON) (S43).

Therefore, during a processing of making a payment using the non-contact IC credit card C31, the payment terminal 100 can prevent electromagnetic interference by turning on the NFC_IC 14 and turning off the first touch panel 12, and can read the information stored in the non-contact IC credit card C31. After the processing of making a payment using the non-contact IC credit card C31 is completed, the payment terminal 100 turns off the NFC_IC 14 and turns on the first touch panel 12, so that interference of radio waves output from the NFC antenna 15 can be prevented and the first touch panel 12 can be used.

When an electronic money payment is selected in S13, the first CPU 11 selects a type of the electronic money card C32 (S51). In this case, for example, a store clerk operates the second touch panel 22, the second touch panel 22 receives an input operation, and the second CPU 21 selects a type of the electronic money card C32 according to the input operation. Then, the first CPU 11 turns on the NFC_IC 14 (non-contact IC: ON) (S52). The first touch panel 12 is turned off (touch panel: OFF) (S53).

In such an ON/OFF state of each device, when the electronic money card C32 is located in a range in which the non-contact communication is possible, the NFC_IC 14 reads the information stored in the electronic money card C32 and obtains an electronic money read information. The first CPU 11 executes a payment processing using the electronic money read information (S54).

For example, the following processes are executed in the payment processing. The first CPU 11 acquires a payment amount from the second CPU 21. The first CPU 11 reads an owned amount of money stored in the electronic money card C32, subtracts the payment amount from the owned amount of money, and writes an amount of money of a subtraction result to the electronic money card C32. Accordingly, the payment processing using the electronic money card C32 is completed. A flow of the payment processing is not limited to this example.

After the payment processing using the electronic money card C32 is completed, the first CPU 11 turns off the NFC_IC 14 (non-contact IC: OFF) (S55). The first touch panel 12 is turned on (touch panel: ON) (S56).

Therefore, during a processing of making a payment using the electronic money card C32, the payment terminal 100 can prevent electromagnetic interference by turning on the NFC_IC 14 and turning off the first touch panel 12, and can read and write an information to and from the electronic money card C32. After the processing of making a payment using the electronic money card C32 is completed, the payment terminal 100 turns off the NFC_IC 14 and turns on the first touch panel 12, so that interference of radio waves output from the NFC antenna 15 can be prevented and the first touch panel 12 can be used.

When a code payment is selected in S13, the second CPU 21 activates the camera 25 (camera: ON) (S61). The camera 25 images a two-dimensional code or the like displayed on a mobile terminal of the purchaser, and sends a captured image to the second CPU 21. The second CPU 21 acquires the captured image, executes an image analysis on the captured image, and acquires (reads) an identification information indicated by a QR code (registered trademark) or the like as a code read information (S62). The second CPU 21 cooperates with, for example, an external server for executing a code payment to execute a payment processing using the code read information (S63).

For example, the following processes are executed in the payment processing. The second CPU 21 transmits a payment request information including, for example, a two-dimensional code read information and a payment amount to the external server via the communication device. The external server receives the payment request information from the payment terminal 100, collates the payment request information with an information stored in the external server, subtracts the payment amount from an owned amount of money associated with an identification number indicated by the code, sets a subtraction result to be a new owned amount of money, and completes a transaction of a commodity purchase. The external server transmits a payment completion notification to the payment terminal 100.

When the payment completion notification is received via the communication device, the second CPU 21 ends the payment processing. A flow of the payment processing is not limited to this example.

After the payment processing using the code is completed, the second CPU 21 ends an operation of the camera 25 (camera: OFF) (S64).

When a cash payment is selected in S13, a payment processing using cash is executed (S71). In this case, the second CPU 21 cooperates with, for example, a cash drawer via the communication device, so that cash can be delivered. For example, when the second CPU 21 acquires an input operation of payment completion via the second touch panel 22, the payment processing is completed.

As described above, the payment terminal 100 (an example of an information processing apparatus) includes the NFC_IC 14 (an example of a first reader) that electrically reads an information (an example of a first information) stored in the non-contact IC card C3 (an example of a first card) in a non-contact manner. The payment terminal 100 includes the first card reader 16 or the second card reader 17 (an example of a second reader) that magnetically or electrically reads an information (an example of a second information) stored in the magnetic card C1 or the contact IC card C2 (an example of a second card) in contact. The payment terminal 100 includes the first touch panel 12 (an example of an input detection device) that electrically detects contact or proximity of a finger or the like (an example of an object) of a purchaser as an input operation. The payment terminal 100 includes the first CPU 11 (an example of a control device) that is electrically connected to the NFC_IC 14, the first card reader 16 or the second card reader 17, and the first touch panel 12.

The first CPU 11 may exclusively control whether to enable reading performed by the NFC_IC 14 (for example, the ON/OFF of the NFC_IC 14) and whether to enable an input detection performed by the first touch panel 12 (for example, the ON/OFF of the first touch panel), based on a detection that the non-contact IC card C3 is placed in a predetermined position (for example, a position within a range in which the non-contact communication is possible) to the NFC_IC 14. Alternatively, the first CPU 11 may exclusively control whether to enable reading performed by the NFC_IC 14 and whether to enable an input detection performed by the first touch panel 12, based on a detection that the magnetic card C1 is placed in a predetermined position (for example, a position when inserting the magnetic card C1 to the first card reader 16) to the first card reader 16. Alternatively, the first CPU 11 may exclusively control whether to enable reading performed by the NFC_IC 14 and whether to enable an input detection performed by the first touch panel 12, based on a detection that the contact IC card C2 is placed in a predetermined position (for example, a position when inserting the contact IC card C2 to the second card reader 17) to the second card reader 17.

Accordingly, even when the non-contact IC card C3 and a card other than the non-contact IC card C3 can be read, the payment terminal 100 can switch between whether to enable reading of the non-contact IC card C3 and whether to enable an input detection performed by the first touch panel 12 depending on which reader reads an information. For example, when reading of the non-contact IC card C3 is enabled, the input detection performed by the first touch panel 12 is disabled, and when reading of the non-contact IC card C3 is disabled, the input detection performed by the first touch panel 12 is enabled. Therefore, the payment terminal 100 can prevent reading of the non-contact IC card C3 and the input detection performed by the first touch panel 12 from electrically interfering with each other, and can prevent reading accuracy of the non-contact IC card C3 and accuracy of the input detection performed by the first touch panel 12 from being deteriorated. As described above, even when the payment terminal 100 reads an information stored in the non-contact IC card C3 and an information stored in a card other than the non-contact IC card C3, the payment terminal 100 can prevent the reading accuracy of the non-contact IC card C3 and input detection accuracy of an electrical signal input operation from being deteriorated.

When a credit card payment is selected as a payment method, the first CPU 11 may enable reading performed by the NFC_IC 14 and disable an input detection performed by the first touch panel 12.

As a result, the payment terminal 100 can be on standby in a state of capable of reading the non-contact IC card C3 serving as a credit card, and can be expected to perform a payment smoothly.

When the credit card payment is selected as a payment method, the first CPU 11 may enable reading performed by the first card reader 16 or the second card reader 17.

Accordingly, the payment terminal 100 can be on standby in a state of capable of reading the magnetic card C1 or the contact IC card C2 serving as a credit card, and can receive an operation of the credit card, for example, in a three payment processes standby state. Therefore, the payment terminal 100 can be expected to perform a payment smoothly when any one credit card is detected.

When reading is performed by the first card reader 16 or the second card reader 17, the first CPU 11 may disable reading performed by the NFC_IC 14 and enable an input detection performed by the first touch panel 12.

Accordingly, when the magnetic card C1 or the contact IC card C2 is brought close to the first card reader 16 or the second card reader 17, the payment terminal 100 can prevent the magnetic card C1 or the contact IC card C2 from being electrically read by the NFC_IC 14. Therefore, erroneous reading by another reader during a payment can be prevented and an erroneous payment can be prevented. Since a payment using the magnetic card C1 or the contact IC card C2 is performed, a payment using the non-contact IC card C3 is not necessary, and there is no problem in making a payment even when the NFC_IC 14 is turned off. The payment terminal 100 can set the first touch panel 12 to be usable immediately after a detection of the magnetic card C1 or the contact IC card C2 while preventing the input detection accuracy from being deteriorated.

When reading is performed by the NFC_IC 14, after a payment processing by the non-contact IC card C3 is completed, the first CPU 11 may disable reading performed by the NFC_IC 14 and enable an input detection performed by the first touch panel 12.

Accordingly, when reading related to a payment using the non-contact IC card C3 is performed, since the first touch panel 12 is turned off, the payment terminal 100 can prevent accuracy of reading performed by the NFC_IC 14 from being deteriorated. When the payment processing by the non-contact IC card C3 is completed, the payment terminal 100 can set the first touch panel 12 to be usable while preventing the input detection accuracy from being deteriorated.

When the electronic money payment is selected as a payment method, the first CPU 11 may enable reading performed by the NFC_IC 14 and disable an input detection performed by the first touch panel 12.

Accordingly, the payment terminal 100 can be on standby in a state of capable of reading the electronic money card C32, and can be expected to perform a payment smoothly.

After a payment processing of the electronic money payment is completed, the first CPU 11 may disable reading performed by the first reader and enable an input detection performed by the input detection device.

When reading related to a payment using the electronic money card C32 is performed, since the first touch panel 12 is turned off, the payment terminal 100 can prevent accuracy of reading performed by the NFC_IC 14 from being deteriorated. When the payment processing by the electronic money card C32 is completed, the payment terminal 100 can set the first touch panel 12 to be usable while preventing the input detection accuracy from being deteriorated.

The second card may include at least one of the contact IC card C2 and the magnetic card C1. The second reader may read the second information in at least one of an electrical manner and a magnetic manner.

Accordingly, the payment terminal 100 can use various cards capable of transmitting data in contact as the second card.

The NFC_IC 14 may read the first information via the NFC antenna 15 (an example of an antenna capable of non-contact communication). The NFC antenna 15 and the first touch panel 12 may be arranged close to each other.

With such a configuration, radio waves transmitted from and received by the NFC antenna 15 and an electrode of the first touch panel 12 may electrically interfere with each other, and reading performed by the NFC_IC 14 and an input detection performed by the first touch panel 12 may be affected. On the other hand, the payment terminal 100 can prevent the electrical interference by exclusively controlling whether to enable reading performed by the NFC_IC 14 and whether to enable an input detection performed by the first touch panel 12.

The first card reader 16 may include the first card slot 16s (an example of a guide portion) that guides the magnetic card C1 into the first card reader 16, the magnetic head 16h (an example of a reading member) that electrically or magnetically reads the magnetic card C1, and the first insertion sensor 16r (an example of a sensor) that is arranged between a place where insertion of the magnetic card is started and the magnetic head 16h in the first card slot 16s and that detects the magnetic card C1.

Accordingly, in a case where the magnetic card C1 is inserted (swiped) into the first card slot 16s, the payment terminal 100 detects the magnetic card C1 by the first insertion sensor 16r when the magnetic card C1 is inserted into the first card slot 16s from the place where the insertion of the magnetic card C1 is started and before the magnetic card C1 reaches the magnetic head 16h. Therefore, the payment terminal 100 can turn off the NFC_IC 14 before reading the information stored in the magnetic card C1. Therefore, electromagnetic interference between the first card reader 16 and the NFC antenna 15 can be prevented from occurring.

Although the embodiments are described above with reference to the drawings, it is needless to say that the present invention is not limited thereto. It will be apparent to those skilled in the art that various changes and modifications may be conceived within the scope of the claims. It is also understood that the various changes and modifications belong to the technical scope of the present invention. Constituent elements in the embodiments described above may be combined freely within a range not departing from the spirit of the present invention.

Although data reading among cards performed by the NFC_IC 14, the first card reader 16, and the second card reader 17 is mainly described in the embodiment described above, data writing may be performed. That is, the NFC_IC 14, the first card reader 16, and the second card reader 17 can at least read data, and may write data. In this case, a control whether to enable writing may be performed in a similar manner to the control whether to enable reading. For example, the first CPU 11 may exclusively control whether to enable writing performed by the NFC_IC 14 and whether to enable an input detection performed by the first touch panel 12.

Although the payment terminal 100 having an external appearance configuration shown in FIGS. 1 to 6 is described, the present invention is not limited thereto. For example, the payment terminal 100 may have a configuration in which the NFC antenna 15, the first card slot 16s, and the second card slot 17s are arranged closer to each other without having an opening H compared with those in the external appearance configuration shown in FIGS. 1 to 6. In this case, the NFC antenna 15, the first card slot 16s, and the second card slot 17s are more likely to electromagnetically interfere with each other. Even in this case, the payment terminal 100 can shift timing when to perform an electromagnetic processing by controlling the ON/OFF of each device, and can appropriately prevent electromagnetic interference among devices.

In the embodiment described above, a program for implementing a function of the information processing method according to the embodiment described above may be applied to an information processing apparatus which is a computer via a network or various storage media, and a program read and executed by a processor of the information processing apparatus and a recording medium storing the program may also be used as an application range.

In the embodiment described above, the processor may be physically configured in any way. When a programmable processor is used, since the processing content can be changed by changing the program, a degree of freedom in design of the processor can be increased. The processor may be configured with one semiconductor chip, or may be physically configured with a plurality of semiconductor chips. When the processor is configured with a plurality of semiconductor chips, controls of the embodiment described above may be respectively implemented by different semiconductor chips. In this case, it can be considered that one processor is configured with the plurality of semiconductor chips. The processor may be configured with a semiconductor chip and a member having a different function (such as a capacitor). One semiconductor chip may be configured to implement a function of the processor and a function other than the function. One processor may be configured with a plurality of processors.

INDUSTRIAL APPLICABILITY

The present invention is useful for an information processing apparatus and an information processing method that can prevent reading accuracy of the non-contact IC card and input detection accuracy of an electrical signal input operation from being deteriorated even when an information stored in a non-contact IC card and an information stored in a card other than the non-contact IC card are read.

What is claimed is:

1. An information processing apparatus, comprising:
a first reader that has a first reading function which electrically reads first information, stored in a communication medium, in a non-contact manner;
a second reader that has a second reading function which electrically or magnetically reads second information, stored in a card, in contact;
a touch panel that electrically detects the contact or proximity of an object as an input detection function; and
a processor that is electrically connected to the first reader, the second reader, and the touch panel,
wherein the first reader reads the first information via an antenna, the antenna being configured for non-contact communication,
the processor, in response to a predetermined process, sets each of the first reader, the second reader, and the input detection function of the touch panel to a standby state,
the processor exclusively controls an ON/OFF of the first reading function of the first reader and an ON/OFF of the input detection function of the touch panel, based on a detection that the communication medium is placed in a predetermined position with respect to the first reader or a detection that the card is placed in a predetermined position with respect to the second reader,
the processor turns OFF the first reader in response to the input detection function of the touch panel being turned ON, and
the processor turns OFF the input detection function of the touch panel in response to the first reader being turned ON.

2. The information processing apparatus according to claim 1, wherein:
when a credit card payment is selected as a payment process, the processor turns ON the first reading function and turns OFF the input detection function of the touch panel.

3. The information processing apparatus according to claim 2, wherein:
when a credit card payment is selected as a payment process, the processor turns ON the second reading function.

4. The information processing apparatus according to claim 2, wherein:
based on a detection that the card is placed at a predetermined position with respect to the second reader, the processor turns OFF the first reading function and turns ON the input detection function of the touch panel.

5. The information processing apparatus according to claim 2, wherein:
when the payment process is completed after the first reader reads the first information, the processor turns OFF the first reading function and turns ON the input detection function of the touch panel.

6. The information processing apparatus according to claim 1, wherein:
when an electronic money payment is selected as a payment process, the processor turns ON the first reading function and turns OFF the input detection function of the touch panel.

7. The information processing apparatus according to claim 6, wherein:
after the payment process of the electronic money payment is completed, the processor turns OFF the first reading function and turns ON the input detection function of the touch panel.

8. The information processing apparatus according to claim 1, wherein:
the card is a contact IC card or a magnetic card; and
the second reader electrically or magnetically reads the second information from the card.

9. The information processing apparatus according to claim 1, wherein:
the antenna and the touch panel are arranged close to each other.

10. The information processing apparatus according to claim 1, wherein the second reader includes:
a card slot that guides the card into the second reader;
a reading member that electrically or magnetically reads the second information stored in the card, with the card being inserted in the card slot; and
a sensor that detects the card inserted in the card slot, with the sensor being arranged between a place where an insertion of the card is started and the reading member.

11. An information processing method of an information processing apparatus, the information processing apparatus including:
a first reader that has a first reading function which electrically reads first information, stored in a communication medium, in a non-contact manner, the first reader reading the first information via an antenna, the antenna being configured for non-contact communication,
a second reader that has a second reading function which electrically or magnetically reads second information, stored in a card, in contact, and
a touch panel that electrically detects the contact or proximity of an object as an input detection function,
the information processing method comprising:
in response to a predetermined process, setting each of the first reader, the second reader, and the input detection function of the touch panel to a standby state; and
exclusively controlling an ON/OFF of the first reading function of the first reader and an ON/OFF of the input detection function of the touch panel, based on a detection that the communication medium is placed in a predetermined position with respect to the first reader or a detection that the card is placed in a predetermined position with respect to the second reader,
wherein, in the exclusively controlling, the first reader is turned OFF in response to the input detection function of the touch panel being turned ON, and
in the exclusively controlling, the input detection function of the touch panel is turned OFF in response to the first reader being turned ON.

* * * * *